United States Patent
Munsters et al.

(10) Patent No.: US 6,499,799 B2
(45) Date of Patent: Dec. 31, 2002

(54) OPEN ROOF CONSTRUCTION FOR A VEHICLE

(75) Inventors: Paulus Johannes Wilhelmus Munsters, Uden (NL); Martinus Wilhelmus Maria Nabuurs, Overloon (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/875,802

(22) Filed: Jun. 6, 2001

(65) Prior Publication Data

US 2002/0033620 A1 Mar. 21, 2002

(30) Foreign Application Priority Data

Jun. 7, 2000 (NL) .............................................. 1015394

(51) Int. Cl.7 ................................. B60J 7/22; B60J 7/06
(52) U.S. Cl. ...................... 296/217; 296/219; 454/129
(58) Field of Search .............................. 296/217, 219; 454/129, 135

(56) References Cited

U.S. PATENT DOCUMENTS

| | | | |
|---|---|---|---|
| 4,291,912 A | 9/1981 | Fox et al. ................... | 296/217 |
| 5,601,330 A | 2/1997 | Ulbrich et al. .............. | 296/217 |
| 6,217,110 B1 * | 4/2001 | Thijssen ..................... | 296/217 |

FOREIGN PATENT DOCUMENTS

| | | | | |
|---|---|---|---|---|
| DE | 3012538 | * | 10/1981 | ................. 296/217 |
| DE | 3828062 | * | 3/1989 | ................. 296/217 |
| DE | 41 23 229 A | | 1/1997 | |
| DE | 196 36 683 C | | 10/1997 | |
| GB | 382781 | * | 11/1932 | ................. 296/217 |
| GB | 2251223 | * | 7/1992 | ................. 296/217 |
| GB | 2 257 669 A | | 1/1999 | |
| JP | 169322 | * | 9/1985 | ................. 296/217 |
| NL | 1009071 | | 11/1999 | |

* cited by examiner

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle comprising a roof opening provided in the roof of the vehicle which can be closed by means of a foldable assembly. A flow-influencing panel is pivotable outwardly from a position substantially in line with the roof towards an inclined position and which panel, as seen in the longitudinal direction of the vehicle, is positioned at a leading end of the roof opening. The panel, in a position in line with the roof, and the closure assembly, in a position closing the roof opening, mutually overlap.

15 Claims, 2 Drawing Sheets

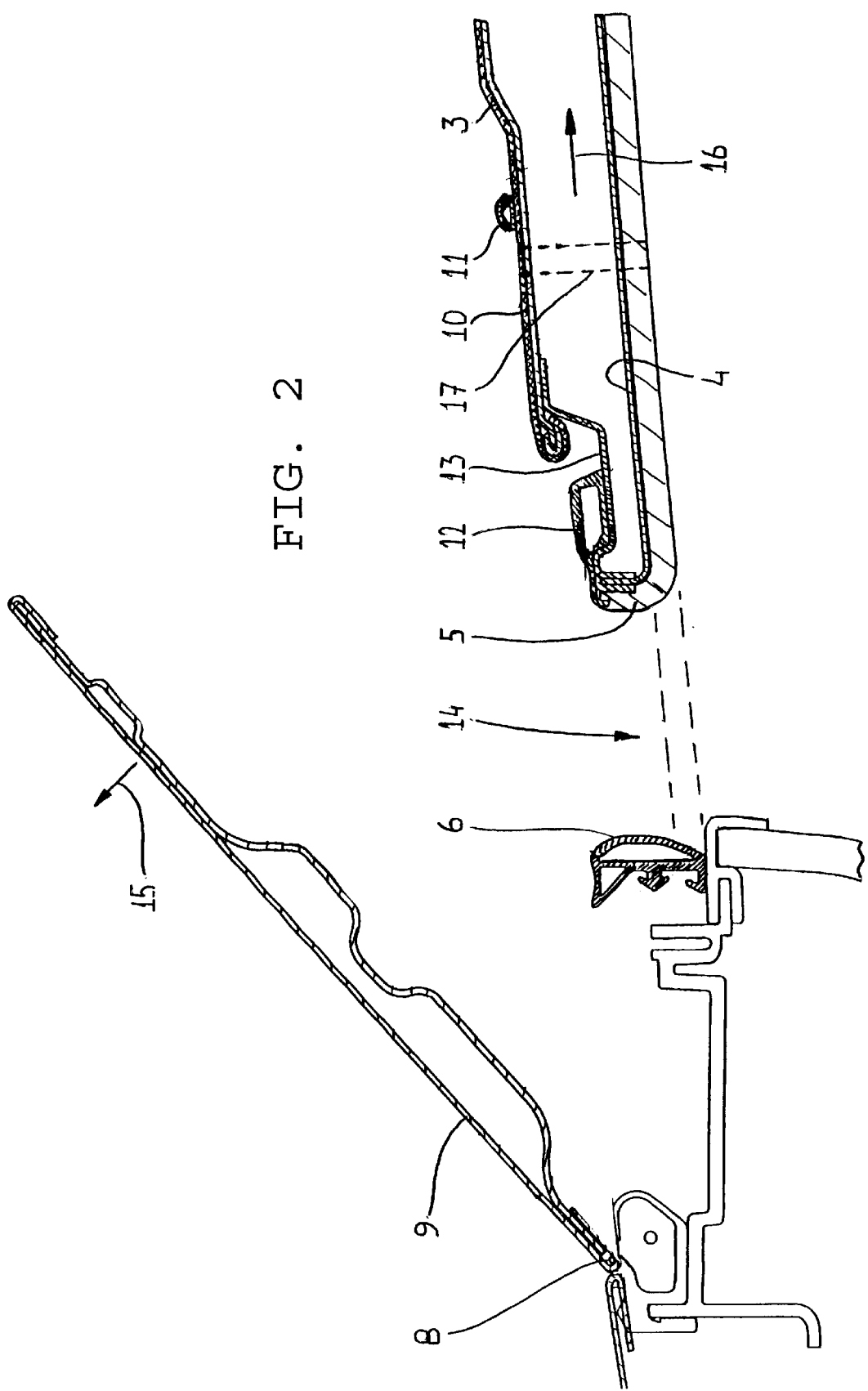

OPEN ROOF CONSTRUCTION FOR A VEHICLE

BACKGROUND OF THE INVENTION

The invention relates to an open roof construction for a vehicle comprising a roof opening provided in the roof of the vehicle which can be closed by means of a foldable closure assembly. The open roof construction has a flow-influencing panel which is pivotable outwardly from a position substantially in line with the roof towards an inclined position. The panel, as seen in the longitudinal direction of the vehicle (front to back), is positioned at the leading end of the roof opening.

Vehicles having an open roof construction of this type, with a foldable closure assembly, are extremely prone to incident wind in an opened roof opening. Annoying noises, such as a low frequency vibration, are the result. In an attempt to counteract such problems, a flow-influencing panel (wind deflector) is provided which is located at the leading edge of the roof opening. When the closure assembly is in its open position the panel is pivoted outwardly towards an inclined position, in which the flow at the upper side of the roof is diverted upwardly, such as to prevent, or at least minimize, undesired incident wind in the opened roof opening.

Known open roof constructions of this type are already disclosed in, among others, German patent applications 3816977 and 3828062. These known constructions however require a complicated motion mechanism, whereas the efficiency of the flow-influencing panel leaves much to be desired. Further, the sealing of the closure assembly is difficult.

SUMMARY OF THE INVENTION

It is an object of the present invention to provide an open roof construction of this type of which the operation is further optimized.

Thus, the open roof construction or assembly according to the invention is characterized in that the panel in its position in line with the roof, and the closure assembly in its position closing the roof opening mutually overlap.

Due to an overlap between the panel and the closure assembly, it is possible to provide the panel with a large dimension, as seen in the longitudinal direction of the vehicle, whereas further the closure assembly can be provided with a large dimension as seen in the longitudinal direction of the vehicle. The large dimension of the closure assembly results in a large roof opening, whereas the large dimension of the panel nevertheless provides an optimal influencing of the flow, such that incident wind in the large roof opening is prevented or reduced to a minimum.

In a preferred embodiment of the open roof construction, the closure assembly has an upper side with a recess for receiving the panel. The recess is dimensioned such that in the overlapping position the outer faces of the panel and the closure assembly substantially are positioned in line.

As a result of this embodiment, a smooth outer face is obtained in the overlapping position (that is the closed position of the roof opening in which the panel is positioned in line with the roof and in which the closure assembly closes the roof opening), leading to a minimized flow resistance. Moreover this promotes the aesthetic appearance of the vehicle with a closed roof opening.

Further, there is an embodiment of the open roof construction according to the invention, in which the closure assembly, in its position closing the roof opening, with its leading edge sealingly engages a stationary part of the roof opening rim.

Of course such a stationary part of the roof opening rim is very rigid, such that the closure assembly may engage it firmly. This results in a proper seal. Moreover, such a seal between the leading edge of the closure assembly and a stationary part of the roof opening rim ensures that the closure assembly only has to move horizontally to reach the closed position. As a result, the total power of a driving element (electric motor or alike) providing the motion of the closure assembly can be used for this horizontal motion, and the seal can be realized in a firm manner. In known open roof constructions, mostly a combination of a horizontal and vertical motion of the closure assembly is applied, such that the power of the driving element has to be divided among both motions and, necessarily, engaging forces between the closure assembly and a surrounding stationary part of the open roof construction are limited. This leads to adverse consequences for the quality of the seal between the mentioned parts.

Further, it is possible that the panel and the closure assembly mutually engage by means of a seal. As a result, sealing of the roof opening is further enhanced. Moreover, this reduces the noise of wind.

In a further embodiment of the open roof construction, the panel is pivotable around a stationary pivot axis. In this aspect, the stationary pivot axis is positioned proximate the leading roof opening edge. In such a case, the panel may be a wind deflector.

Further, it is possible that the closure assembly in the area of its leading edge can be provided with closable ventilation openings. When the panel is pivoted outwardly, behind of it (that is, at the ventilation openings) a negative pressure is created enhancing the ventilation through these ventilation openings.

It is possible that these ventilation openings can be closable by the panel when the latter is positioned in line with the roof.

The scope of the invention further includes an open roof construction for a vehicle comprising a roof opening provided in the roof of the vehicle which can be closed by a foldable closure assembly. An area of a leading edge of the foldable closure assembly is provided with closable ventilation openings.

In this aspect it again is possible that the ventilation openings are closable by a panel which at the leading edge of the roof opening is pivotable between a position in which it substantially is positioned in line with the roof while closing the ventilation openings, and a position in which it is inclined relative to the roof.

BRIEF DESCRIPTION OF THE DRAWINGS

Hereinafter the invention is elucidated by means of the drawing, in which an embodiment of the open roof construction according to the invention is represented.

FIG. 2 illustrates the embodiment in a second position.

DESCRIPTION OF THE ILLUSTRATIVE EMBODIMENTS

Figure 1:
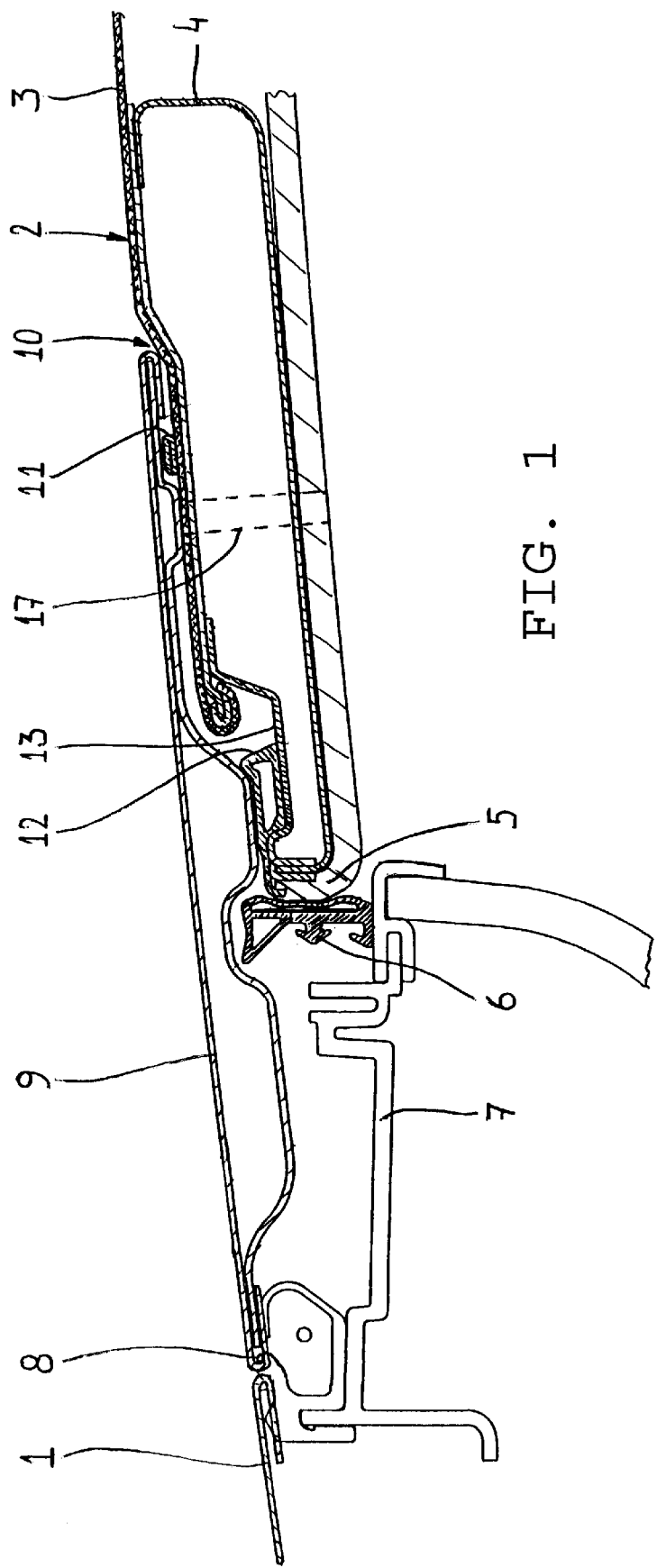
FIG. 1 illustrates, in a longitudinal section and schematically, the embodiment of the open roof construction according to the invention in a first position.

Referring to FIG. 1, part of a roof 1 of a vehicle is visible in which a roof opening 14 (see FIG. 2) is provided. The roof opening is closable by a closure assembly shaped like a folding roof 2. This folding roof 2 comprises a flexible cloth 3 which with its leading edge is attached to transverse beam 4 which, in a way not shown further, can move freely to and for in guiding elements in the longitudinal direction of the vehicle. The manner of folding and guiding the folding roof 2 does not form part of the present invention and for a possible embodiment thereof reference is made to U.S. patent application Ser. No. 09/616,162, filed Jul. 14, 2000, which is incorporated herein by reference in its entirety.

In the position shown in FIG. 1, a leading end 5 of the transverse beam 4 sealingly engage a flexible seal 6, making part of the stationary roof construction 7. As a result, the roof opening 14 principally is closed. In this position, the cloth 3 is strongly tensioned.

A flow-influencing panel 9 (a so-called wind deflector) is pivotably connected to the stationary elements of the roof 1 at a pivot axis 8. In the position shown in FIG. 1, the wind deflector 9 is positioned within the roof 1, such that the wind deflector 9 is in line or substantially an ongoing, continuous contour along the outer face of the roof 1, wind deflector 9 and folding roof 2 is obtained. For this reason, the folding roof 2 further has at its upper face a recess 10 for receiving at least part of the wind deflector 9.

Sealing elements 11 and 12 can be applied to the folding roof 2 which in the illustrated, closed position of the open roof construction, co-operate with the wind deflector 9. Moreover, a water discharge gutter 13 can be provided alongside the sealing element 12.

As illustrated in FIG. 1, the wind deflector 9 and the folding roof 2 mutually overlap a substantial amount.

FIG. 2 shows the open roof construction as illustrated in FIG. 1 in a position, in which the roof opening 14 already is opened partially. In correspondence with arrow 15, the wind deflector 9 is pivoted around pivot axis 8 towards a position in which the flow (when the vehicle is moving in a forward direction) is deflected upwardly, away from the roof opening 14. As a result, undesired incident wind in the opened roof opening 14 can be prevented or at least minimized.

The folding roof 2 (or especially the transverse beam 4) is moved to the right in correspondence with arrow 16 (that is in a rearward direction of the vehicle), such that the roof opening 14 is opened progressively. Then, in a way known per se, the cloth 3 will be folded zig-zag like. Because now the wind deflector 9 no longer engages sealing elements 11 and 12, these elements having assumed their non-deformed position. The same applies with respect to the seal 6, which now no longer engages the leading end 5 of the folding roof 2.

The motion of the folding roof 2, in the illustrated embodiment according to arrow 16, mainly occurs in a horizontal direction, without also requiring a displacement of the folding roof in a different direction (for example vertically).

In the vicinity of its leading end 5 (for example at the so-called control beam) the folding roof 2 can be provided with ventilation openings 17. In the position according to FIG. 1, these ventilation openings 17 are closed by the panel 9. In the position according to FIG. 2 the ventilation openings 17 are freed or exposed. Behind the panel or wind deflector 9, a negative pressure is induced which promotes ventilation through the ventilation openings.

The invention is not limited to the embodiment described before which may be varied widely within the scope of the invention as defined by the claims. As such, a folding roof 2 comprising ventilation openings 17 may also be combined with other elements for closing the ventilation openings, instead of a panel or wind deflector 9.

What is claimed is:

1. An open roof assembly for a vehicle having a roof opening provided in a roof of the vehicle, the open roof assembly comprising:

a stationary frame part to be secured to the roof, the stationary frame part comprising a forward edge portion and a rearward edge portion;

a foldable closure assembly supported by the stationary frame part, which is adjustable between a closed position, in which it closes the roof opening, and an open position, in which it opens the roof opening at least on a front side thereof for forward motion of the vehicle, the foldable closure assembly comprising a transverse beam having a leading end and a rain gutter rearward of the leading end; and a flow-influencing panel pivotable outwardly from a closed position substantially in line with the roof towards an open inclined position, the panel, as seen in the longitudinal direction of the vehicle, pivots at the forward edge portion of the stationary frame part, wherein the panel in its closed position overlaps the leading end of the transverse beam and the rain gutter and wherein the leading end engages a seal on the stationary frame part.

2. The open roof assembly according to claim 1, wherein the closure assembly has an upperside including a recess for receiving the panel, the panel having an outer face, wherein the recess is dimensioned such that when the panel and the closure assembly are in the closed position the outer face of the panel and an outer face of the closure assembly, proximate the panel, are substantially positioned in line.

3. The open roof assembly according to claim 1, wherein the panel and the transverse beam mutually engage each other in a overlapped position by a plurality of sealing elements.

4. The open roof assembly according to claim 1, wherein the panel is pivotable about a stationary pivot axis.

5. The open roof assembly according to claim 1, wherein the transverse beam is provided with at least one closable ventilation opening.

6. The open roof assembly according to claim 5, wherein the at least one ventilation opening is closable by the panel when the panel is positioned in line with the roof.

7. An open roof assembly for a vehicle having a roof opening provided in the roof of the vehicle, the open roof assembly, comprising:

a foldable closure assembly for selectively closing and at least partially opening the roof opening, wherein the closure assembly has a leading edge portion provided with at least one ventilation opening; and a pivotable panel, wherein said ventilation opening is closed by the panel in a position in which the panel is positioned in line with the roof and overlaps the leading edge portion, and wherein said at least one ventilation opening is opened in a position in which the panel is inclined relative to the roof.

8. The open roof assembly according to claim 7, wherein the panel comprises a wind deflector.

9. An open roof assembly for a vehicle having a roof opening provided in a roof of the vehicle, the open roof assembly comprising:

a stationary frame part to be secured to the roof, the stationary frame part comprising a front sealing surface;

a foldable closure assembly supported by the stationary frame part, which is adjustable between a closed position, in which it closes the roof opening, and an open position, in which it opens the roof opening at least on a front side thereof for forward motion of the vehicle, the foldable closure assembly comprising a transverse beam having a leading end, wherein in the closed position the leading end of the transverse beam engages the front sealing surface; and a flow-influencing panel pivotable outwardly from a closed position substantially in line with the roof towards an open inclined position, the panel, as seen in the longitudinal direction of the vehicle, pivots at the forward edge of the stationary frame part, wherein the panel in its closed position overlaps the front sealing surface and the leading end of the transverse beam.

10. The open roof assembly according to claim 9, wherein the closure assembly has an upperside including a recess for receiving the panel, the panel having an outer face, wherein the recess is dimensioned such that when the panel and the closure assembly are in the closed position, the outer face of the panel and an outer face of the closure assembly, proximate the panel, are substantially positioned in line.

11. The open roof assembly according to claim 10 wherein the transverse beam further comprises at least one ventilation opening.

12. The open roof assembly according to claim 11 wherein said at least one ventilation opening is positioned at the recess extending through the closure assembly.

13. The open roof assembly according to claim 12 wherein said at least one ventilation opening is closed when the panel is in the closed position.

14. The open roof assembly according to claim 13 wherein the transverse beam further comprises a rain gutter rearward of the leading end.

15. The open roof assembly of claim 9 wherein the stationary frame part includes a deformable sealing element forming the front sealing surface.

* * * * *